United States Patent
Ieda

(10) Patent No.: US 9,605,133 B2
(45) Date of Patent: Mar. 28, 2017

(54) POLYVINYL ALCOHOL AQUEOUS SOLUTION

(71) Applicant: SEKISUI CHEMICAL CO., LTD., Osaka (JP)

(72) Inventor: Yasuyuki Ieda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/783,146

(22) PCT Filed: Apr. 30, 2014

(86) PCT No.: PCT/JP2014/061984
§ 371 (c)(1),
(2) Date: Oct. 8, 2015

(87) PCT Pub. No.: WO2014/178402
PCT Pub. Date: Nov. 6, 2014

(65) Prior Publication Data
US 2016/0032081 A1     Feb. 4, 2016

(30) Foreign Application Priority Data

May 1, 2013  (JP) ................................ 2013-096386
May 1, 2013  (JP) ................................ 2013-096387
Mar. 6, 2014 (JP) ................................ 2014-044092

(51) Int. Cl.
| | | |
|---|---|---|
| C08K 5/54 | (2006.01) | |
| B29C 41/12 | (2006.01) | |
| C08J 7/04 | (2006.01) | |
| C08J 5/18 | (2006.01) | |
| C08K 5/01 | (2006.01) | |
| C08K 5/06 | (2006.01) | |
| C08K 5/5419 | (2006.01) | |
| C08K 5/101 | (2006.01) | |
| C08K 5/103 | (2006.01) | |
| C08K 5/47 | (2006.01) | |

(52) U.S. Cl.
CPC ............ *C08K 5/5419* (2013.01); *B29C 41/12* (2013.01); *C08J 5/18* (2013.01); *C08J 7/047* (2013.01); *C08K 5/01* (2013.01); *C08K 5/06* (2013.01); *C08K 5/101* (2013.01); *C08K 5/103* (2013.01); *C08K 5/47* (2013.01); *C08J 2329/04* (2013.01); *C08J 2429/04* (2013.01)

(58) Field of Classification Search
CPC .... B29C 41/12; C08J 5/18; C08J 7/047; C08J 2429/04; C08J 2329/04; C08K 5/01; C08K 5/053; C08K 5/06; C08K 5/101; C08K 5/5419; C08K 5/103; C08K 5/47; C08L 83/12; C09D 129/04
USPC ....................................................... 524/557
See application file for complete search history.

(56) References Cited

U.S. PATENT DOCUMENTS

| | | | | |
|---|---|---|---|---|
| 4,792,357 A | * | 12/1988 | Bier ....................... | C09D 5/024 106/146.51 |
| 6,303,199 B1 | * | 10/2001 | Takada .................... | C08J 7/047 428/34.8 |
| 2008/0302274 A1 | * | 12/2008 | Neubert ............... | C09D 7/1233 106/287.25 |

FOREIGN PATENT DOCUMENTS

| | | |
|---|---|---|
| CN | 1690115 | 11/2005 |
| CN | 101033320 | 9/2007 |
| CN | 101792535 | 8/2010 |
| CN | 102834439 | 12/2012 |
| JP | 9-157473 | 6/1997 |
| JP | 10-7828 | 1/1998 |
| JP | 2002-144419 | 5/2002 |
| JP | 2003-26945 | 1/2003 |
| JP | 2003-145692 | 5/2003 |
| JP | 2003145692 A * | 5/2003 |
| JP | 2004-131478 | 4/2004 |
| JP | 2007-161795 | 6/2007 |
| JP | 2007-530764 | 11/2007 |
| JP | 2010-12778 | 1/2010 |
| JP | 2012-197389 | 10/2012 |
| JP | 2013-171210 | 9/2013 |
| WO | 2005/094161 | 10/2005 |

OTHER PUBLICATIONS

International Search Report issued Jul. 15, 2014 in International Application No. PCT/JP2014/061984.

* cited by examiner

*Primary Examiner* — Michael M Bernshteyn
(74) *Attorney, Agent, or Firm* — Wenderoth, Lind & Ponack, L.L.P.

(57) ABSTRACT

The present invention provides a polyvinyl alcohol aqueous solution capable of suppressing contamination by components other than polyvinyl alcohol to form a film that contains few air bubbles and is excellent in adhesion to a base material, and a laminated film formed of the polyvinyl alcohol aqueous solution. The present invention relates to a polyvinyl alcohol aqueous solution including polyvinyl alcohol, a surface tension regulator, and water, the surface tension regulator being at least one selected from the group consisting of a polyether silicone compound, a glycerol compound, a cyclic hydrocarbon compound, a propylene glycol compound, and a fatty acid ester compound, the polyvinyl alcohol aqueous solution containing 500 to 10000 parts by weight of water based on 100 parts by weight of the polyvinyl alcohol and having a surface tension of 45 to 72 mN/m.

9 Claims, No Drawings

POLYVINYL ALCOHOL AQUEOUS SOLUTION

TECHNICAL FIELD

The present invention relates to a polyvinyl alcohol aqueous solution capable of suppressing contamination by components other than polyvinyl alcohol to form a film that contains few bubbles and is excellent in adhesion to a base material. The present invention also relates to a laminated film formed from the polyvinyl alcohol aqueous solution.

BACKGROUND ART

Polyvinyl alcohol (hereinafter, also referred to as PVA), which is excellent in transparency, oil resistance, chemical resistance, and gas (e.g. oxygen) barrier properties, has been widely used as a packaging material. In recent years, a packaging material for foods, drugs, industrial chemicals, agrochemicals, or the like whose characteristics are largely affected by oxidation degradation has been required to have higher oxygen barrier properties.

In cases where a PVA resin is used for various packaging materials, commonly, the PVA resin is first dissolved in water to give a PVA aqueous solution, and the PVA aqueous solution is cast to be formed into a film or applied to a base material. However, since the PVA aqueous solution has a high surface tension, the PVA aqueous solution is easily foamable and is likely to be formed into a film before defoamation of the applied solution is sufficiently performed. The gas barrier properties of such a film are significantly lowered due to the bubbles therein.

For producing a PVA cheese cloth or a PVA heat-insulation curtain to be used in a vinyl house, a PVA film needs to be stretched. If the PVA film contains bubbles or contaminants therein, the PVA film upon stretching may be torn from the portion where bubbles or contaminants are contained to be ruptured, which results in a great cost loss. Even if the film is not ruptured upon stretching thereof, defectives in the film is widened by stretching to provide an improper appearance.

A PVA film, especially a PVA film with a high degree of saponification is used for packaging textile products. A PVA film even with a high degree of saponification absorbs or releases moisture in accordance with a humidity change therearound. Accordingly, if the package is left for a long period of time, the plasticizer in the film may bleed out to the film surface, and the bled plasticizer may migrate to the packaged product or be scattered together with the absorbed or released moisture.

To solve such problems, Patent Literature 1 discloses that the use of a resin composition containing a water-soluble PVA resin having a 1,2-diol structural unit and a water-swelling layered inorganic compound enables preparation of an aqueous coating liquid having low foaming and high defoaming properties.

Patent Literature 2 discloses a method for producing a PVA film including the steps of passing a film-forming material containing PVA through a filter and forming the film-forming material into a film. Patent Literature 2 teaches that a PVA film to be stretched can be produced by filling, when a filter is changed, a new filter with water, an aqueous solution, a liquid soluble in water, or a liquid mainly containing a water-soluble liquid.

Patent Literature 3 discloses that the use of a compound having a specific hydroxy group and a specific carboxyl group enables production of a PVA film in which a plasticizer contained in the film does not bleed out to the film surface and the flexibility can be maintained even after standing under severe conditions such as low temperature and low humidity conditions or high temperature and high humidity conditions.

CITATION LIST

Patent Literature

Patent Literature 1: JP-A 2007-161795
Patent Literature 2: JP-A 2002-144419
Patent Literature 3: JP-A H09-157473

SUMMARY OF INVENTION

Technical Problem

The present invention aims to provide a polyvinyl alcohol aqueous solution capable of suppressing contamination by components other than polyvinyl alcohol to form a film that contains few bubbles and is excellent in adhesion to a base material, and a laminated film formed from the polyvinyl alcohol aqueous solution.

Solution to Problem

Even when the method disclosed in Patent Literature 1 or Patent Literature 2 is employed, the problem of easy formation of bubble traces inside or on the surface of the resulting film is not solved. As a result, the gas barrier properties of the obtained PVA film may be significantly lowered, or the PVA film may be ruptured upon stretching due to the bubbles or droplets.

Even in the case of the PVA solution as disclosed in Patent Literature 3, it is difficult to prevent bleeding of the plasticizer to the film surface after casting of the solution into a sheet form.

The present invention relates to a polyvinyl alcohol aqueous solution including polyvinyl alcohol, a surface tension regulator, and water, the surface tension regulator being at least one selected from the group consisting of a polyether silicone compound, a glycerol compound, a cyclic hydrocarbon compound, a propylene glycol compound, and a fatty acid ester compound, the polyvinyl alcohol aqueous solution containing 500 to 10000 parts by weight of water based on 100 parts by weight of the polyvinyl alcohol and having a surface tension of 45 to 72 mN/m.

The present invention is specifically described in the following.

The present inventors found out that, when a polyvinyl alcohol aqueous solution is blended with a predetermined surface tension regulator and has a water content and a surface tension within predetermined ranges, the polyvinyl alcohol aqueous solution can form a film that suppresses contamination by components other than polyvinyl alcohol, contains few bubbles, and is excellent in adhesion to a base material, thereby completing the present invention.

In the following, the present invention is described in detail.

[Polyvinyl Alcohol Aqueous Solution]

The polyvinyl alcohol (hereafter, also referred to as PVA) aqueous solution according to the present invention is used for obtaining a PVA film. The PVA aqueous solution according to the present invention contains PVA, a surface tension regulator, and water.

The lower limit of the surface tension of the PVA aqueous solution according to the present invention is 45 mN/m, and the upper limit thereof is 72 mN/m.

If the surface tension is less than 45 mN/m, when a laminated film is formed, the surface tension regulator may bleed to the film surface or the interface between the film and the base material, lowering the adhesion of the film to the base material.

Preferably, the lower limit of the surface tension is 50 mN/m, and the upper limit thereof is 60 mN/m.

The surface tension is measured at 20° C. The surface tension is measured by a conventionally known method such as a drop weight method, a capillary rise method, a ring method, or a plate method. For example, the surface tension can be measured with an automatic tensiometer DY-300 produced by Kyowa Interface Science Co., Ltd. by a plating method (Wilhelmy method).

When the PVA aqueous solution according to the present invention has a constitution as mentioned above, bubble traces are less likely to be left in a PVA film formed from the PVA aqueous solution. Accordingly, when a packaging film or a film to be stretched is prepared using the PVA film, the gas barrier properties can be effectively enhanced in the case of the packaging film, and a uniform film can be obtained in the case of the PVA film to be stretched. The PVA film is preferably used for forming a packaging film, and is also preferably used for forming a film to be stretched.

Moreover, when the PVA aqueous solution according to the present invention has a constitution as mentioned above, deposits are less likely to be generated inside and on the surface of the film after film formation. In this case, when a PVA film is formed on a supporting member, for example, the uniformity of the thickness and the smoothness of the surface of the PVA film can be effectively enhanced. Moreover, the adhesion of the PVA film to the supporting member can be effectively increased.

The enhanced adhesion can reduce the possibility of removal of the PVA film from the supporting member during the processing steps such as surface treatment, stretching, or punching.

Each component used in the PVA aqueous solution according to the present invention is specifically described in the following.

(Polyvinyl Alcohol (PVA))

The polyvinyl alcohol aqueous solution of the present invention contains polyvinyl alcohol.

When the polyvinyl alcohol aqueous solution of the present invention is used for forming a film, the polyvinyl alcohol is a resin mainly constituting the film.

The polyvinyl alcohol is obtained by polymerizing a vinyl ester to give a polymer and then saponifying the polymer, namely hydrolyzing the polymer, in accordance with a conventionally known method. An alkali or an acid is commonly used in saponification. Preferably, an alkali is used in saponification. Only one kind of polyvinyl alcohol may be used, or two or more kinds thereof may be used in combination.

Examples of the vinyl ester include vinyl acetate, vinyl formate, vinyl propionate, vinyl butyrate, vinyl pivalate, vinyl versatate, vinyl laurate, vinyl stearate, and vinyl benzoate.

The polymerization method of the vinyl ester is not particularly limited. Examples of the polymerization method include solution polymerization, bulk polymerization, and suspension polymerization.

Examples of a polymerization catalyst used in polymerization of the vinyl ester include 2-ethylhexylperoxydicarbonate ("TrigonoxEHP" produced by Tianjin McEIT CO., LTD.), 2,2'-azobisisobutyronitrile (AIBN), t-butylperoxyneodecanoate, bis(4-t-butylcyclohexyl)peroxydicarbonate, di-n-propylperoxydicarbonate, di-n-butylperoxydicarbonate, di-cetylperoxydicarbonate, and di-s-butylperoxydicarbonate. Only one kind of the polymerization catalyst may be used, or two or more thereof may be used in combination.

The polymer obtained by polymerizing the vinyl ester is preferably a polyvinyl ester because the degree of saponification can be easily controlled within a favorable range.

The polymer obtained by polymerizing the vinyl ester may be a copolymer of the vinyl ester and another monomer. In other words, the polyvinyl alcohol may be composed of a copolymer of the vinyl ester and another monomer. Examples of the other monomer, namely a comonomer to be copolymerized include olefins, (meth)acrylic acid and salts thereof, (meth)acrylic acid esters, (meth)acrylamide derivatives, N-vinyl amides, vinyl ethers, nitriles, vinyl halides, allyl compounds, maleic acid and salts thereof, maleic acid esters, itaconic acid and salts thereof, itaconic acid esters, vinyl silyl compounds, and isopropenyl acetate. Each of the other monomers may be used alone, or two or more thereof may be used in combination.

Examples of the olefins include ethylene, propylene, 1-butene, and isobutene. Examples of the (meth)acrylic acid esters include methyl(meth)acrylate, ethyl(meth)acrylate, n-propyl(meth)acrylate, i-propyl(meth)acrylate, n-butyl(meth)acrylate, and 2-ethylhexyl(meth)acrylate. Examples of the (meth)acrylamide derivatives include acrylamide, N-methylacrylamide, N-ethylacrylamide, N,N-dimethylacrylamide, and (meth)acrylamide propane sulfonate and salts thereof. Examples of the N-vinyl amides include N-vinyl pyrrolidone. Examples of the vinyl ethers include methyl vinyl ether, ethyl vinyl ether, n-propyl vinyl ether, i-propyl vinyl ether, and n-butyl vinyl ether. Examples of the nitriles include (meth)acrylonitrile. Examples of the vinyl halides include vinyl chloride and vinylidene chloride. Examples of the allyl compounds include allyl acetate and allyl chloride. Examples of the vinyl silyl compound include vinyltrimethoxysilane.

In cases where the polyvinyl alcohol and the other monomer is copolymerized to provide a modified PVA, the modification amount is preferably 15 mol % or less, and more preferably 5 mol % or less. In other words, the amount of the structural unit derived from the vinyl ester is preferably 85 mol % or more, and more preferably 95 mol % or more, and the structural unit derived from the other monomer is preferably 15 mol % or less, and more preferably 5 mol % or less in 100 mol % of the total of the structural unit derived from the vinyl ester and the structural unit derived from the other monomer in the modified PVA. The polyvinyl alcohol as used herein includes a modified polyvinyl alcohol (modified PVA). Moreover, the polyvinyl alcohol film includes a modified polyvinyl alcohol (modified PVA) film obtainable by forming a modified polyvinyl alcohol (modified PVA) into a film.

The polyvinyl alcohol has a degree of saponification of preferably 90 mol % or more, more preferably 92 mol % or more, still more preferably 93 mol % or more, and particularly preferably 94 mol % or more, and preferably 100 mol % or less, more preferably 99.9 mol % or less, still more preferably 99.0 mol % or less, particularly preferably less than 98.5 mol %, and most preferably less than 98 mold. When the degree of saponification is equal to or more than the lower limit and equal to or less than the upper limit, the water resistance and gas barrier properties of the PVA film are further enhanced. From the standpoint of enhancing both the water resistance and gas barrier properties in a balanced manner, the PVA particularly preferably has a degree of saponification of 92 mol % or more but 99.0 mol % or less.

The degree of saponification is measured in conformity with JIS K6726. The degree of saponification indicates the proportion of the units actually saponified to vinyl alcohol units in the units to be converted to vinyl alcohol units by saponification.

The degree of saponification may be adjusted by any method. The degree of saponification can be appropriately adjusted by controlling the saponification conditions, namely, the hydrolysis conditions.

The degree of polymerization of the PVA is not particularly limited. The PVA has a degree of polymerization of preferably 1000 or more, more preferably 1500 or more, still more preferably 1800 or more, further preferably 2000 or more, still further preferably 2300 or more, particularly preferably 2600 or more, and most preferably 2700 or more, and preferably 4000 or less, more preferably 3500 or less, still more preferably 3000 or less, and particularly preferably 2900 or less. When the degree of polymerization is equal to or more than the lower limit and equal to or less than the upper limit, the film strength of the PVA film is further enhanced, which further facilitates stretching of the PVA film. When the degree of polymerization is equal to or less than the upper limit, the solubility of the PVA in a solvent is enhanced, which further facilitates film formation by casting. The degree of polymerization is measured in conformity with JIS K6726.

The amount of the polyvinyl alcohol is preferably 1% by weight or more, more preferably 5% by weight or more, and still more preferably 7% by weight or more, and preferably 15% by weight or less, more preferably 13% by weight or less, still more preferably 12% by weight or less, particularly preferably 10% by weight or less, and most preferably 9% by weight or less in 100% by weight of the polyvinyl alcohol aqueous solution of the present invention. When the amount of the polyvinyl alcohol is equal to or more than the lower limit, the viscosity of the polyvinyl alcohol aqueous solution is appropriately increased, so that the drying time is further shortened and the thickness of the resulting PVA film becomes more uniform. As a result, a higher quality PVA film can be obtained. When the amount of the polyvinyl alcohol is equal to or less than the upper limit, the viscosity of the polyvinyl alcohol aqueous solution is appropriately lowered, so that casting of the PVA aqueous solution is facilitated and the resulting PVA film is still less likely to contain bubble traces and droplets.

(Surface Tension Regulator)

The polyvinyl alcohol aqueous solution of the present invention contains at least one surface tension regulator selected from the group consisting of polyether silicone compounds, glycerol compounds, cyclic hydrocarbon compounds, propylene glycol compounds, and fatty acid ester compounds.

Containing the surface tension regulator, the polyvinyl alcohol aqueous solution of the present invention can have a surface tension within a range of 45 to 72 mN/m.

Moreover, containing the surface tension regulator can prevent formation of bubbles in the polyvinyl alcohol aqueous solution.

The polyether silicone compound is preferably a silicone surfactant with an ether structure.

Examples of the silicone surfactant with an ether structure include silicone surfactants with polyether structures at both terminals of silicone ("X-224952", "X-22-4272", and "X22-6266" all produced by Shin-Etsu Chemical Co., Ltd.), silicone surfactants with an polyether structure in the side chain of silicone ("KF-351A", "KF-352A", "KF-353", "KF-354L", "KF-355A", "KF-615A", "KF-945", "KF-640", "KF-642", "KF-643", "KF-6020", "KS-604", "X-50-1039A", "X-50-1105G", "X-22-6191", "X-22-4515", "KF-6011", "KF-6012", "KF-6015", and "KF-6017" all produced by ShinEtsu Chemical Co., Ltd.), and surfactants with polyether structures at both terminals of silicone ("KF-6004", "KF-889", "X-22-4741", "KF-1002", "X-22-4952", "X-22-4272", and "X-22-6266" all produced by Shin-Etsu Chemical Co., Ltd.). Since bubbles can be effectively removed, the silicone surfactant is more preferably a silicone surfactant with a polyether structure in the side chain of silicone.

The silicone surfactant with an ether structure has a HLB of preferably 0 or more but 12.0 or less.

The Hydrophile Lipophile Balance (HLB) is a numerical value representing a balance between the hydrophilicity and the hydrophobicity. The Griffin's equation is represented by the hydrophile lipophile balance (HLB) obtained by dividing the mass of an atomic group of a hydrophilic portion by the molecular mass. A smaller value of the HLB represents stronger hydrophobicity, and a larger value of the HLB represents stronger hydrophilicity.

Accordingly, when a silicone surfactant with an ether structure having an appropriate HLB is selected, an obtained PVA film is further less likely to have bubble traces and droplets therein. The silicone surfactant with an ether structure has an HLB of preferably 0 or more, more preferably 1.0 or more, and still more preferably 1.5 or more, and preferably 12.0 or less, more preferably 10.0 or less, and still more preferably 9.0 or less. When the HLB of the silicone surfactant with an ether structure is equal to or more than the lower limit and equal to or less than the upper limit, an obtained PVA film is further less likely to have bubble traces and droplets therein.

The glycerol compound is preferably, for example, a surfactant with a polyglycerol alkyl ester structure. Preferable examples of the surfactant with a polyglycerol alkyl ester structure include a surfactant represented by the formula (1). A surfactant with a polyglycerol alkyl structure other than the surfactant represented by the formula (1) may also be used. Since bubbles can be effectively removed, the surfactant with a polyglycerol alkyl ester structure is preferably a surfactant represented by the formula (1).

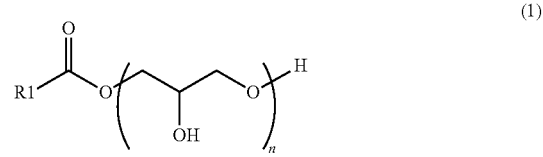

(1)

In the formula (1), R1 represents a C12-C17 alkyl group, and n represents an integer of 1 to 8.

The surfactant with a polyglycerol alkyl ester structure is not particularly limited, and examples thereof include glycerol fatty acid monoesters ("MONOGLY D" and "MONOGLY M" both produced by NOF CORPORATION), glycerol monostearate ("MONOGLY I" and "MONOGLY MB" both produced by NOF CORPORATION), polyglycerol oleic acid esters ("UNIGLY GO-102" produced by NOF CORPORATION), polyglycerol lauric acid esters ("UNIGLY GL-106" produced by NOF CORPORATION), and polyglycerol stearic acid esters ("UNIGLY GS-106" produced by NOF CORPORATION). Since bubbles can be effectively removed, the surfactant with a polyglycerol alkyl ester structure is preferably a polyglycerol lauric acid ester or a polyglycerol stearic acid ester.

The cyclic hydrocarbon compound is a hydrocarbon compound with a cyclic structure. Examples of the cyclic structure in the hydrocarbon compound with a cyclic structure include an alicyclic structure and an aromatic structure. The cyclic structure may be an alicyclic structure or an aromatic structure, and is preferably an alicyclic structure.

Preferable examples of the cyclic hydrocarbon compound include hexane, toluene, 1-methyl cyclohexanol, benzene, xylene, ethylbenzene, cumene, methylcyclopentane, cyclohexane, methylcyclohexane, ethylcyclohexane, and cyclohexene. Since the solubility parameter is low and formation of bubble traces can be further suppressed, the cyclic hydrocarbon compound is preferably hexane, toluene, or cyclohexane.

The propylene glycol compound preferably has an ether structure, and examples thereof include propylene glycol monomethyl ether, propylene glycol monoethyl ether, propylene glycol monomethyl ether acetate, propylene glycol monoethyl ether acetate, propylene glycol monopropyl ether, propylene glycol butyl ether, propylene glycol butyl ether acetate, dipropylene glycol monomethyl ether, dipropylene glycol monoethyl ether, and tripropylene glycol monomethyl ether. Since bubbles can be effectively removed, the propylene glycol compound is preferably propylene glycol monomethyl ether, propylene glycol monoethyl ether, propylene glycol monomethyl ether acetate, or propylene glycol monoethyl ether acetate.

The fatty acid ester compound is preferably a compound having a structure represented by the formula (2).

R2COOR3    (2)

In the formula (2), R2 represents a hydrogen atom or a C1-C3 alkyl group, and R3 represents a hydrogen atom or C1-C6 alkyl group.

Examples of the fatty acid ester compound include propyl formate, butyl formate, isobutyl formate, pentyl formate, acetic acid, ethyl acetate, propyl acetate, isopropyl acetate, butyl acetate, isobutyl acetate, pentyl acetate, isopentyl acetate, sec-hexyl acetate, propionic acid, methyl propionate, ethyl propionate, butyl propionate, methyl butyrate, ethyl butyrate, isobutyric acid, and isobutyl isobutyrate. In particular, the fatty acid ester compound is preferably butyl formate, isobutyl formate, propyl acetate, or ethyl propionate because the boiling points thereof are similar to the boiling point of water.

When the surface tension regulator used is the cyclic hydrocarbon compound, propylene glycol compound, or fatty acid ester compound, a liquid organic solvent is preferably used.

In this case, the boiling point of the surface tension regulator is preferably 60° C. or higher but 160° C. or lower. If the boiling point is lower than 60° C., the surface tension regulator is likely to volatilize from the PVA aqueous solution. As a result, bubbles may not be sufficiently removed. If the boiling point is higher than 160° C., the surface tension regulator tends to be left in the PVA film. In such a case, adhesion of the PVA film to a supporting member and adhesion of the PVA film to a metal roll upon formation of the film may be lowered, so that production of the PVA film becomes difficult.

The boiling point of the surface tension regulator is more preferably 80° C. or higher, and still more preferably 90° C. or higher. When the boiling point is equal to or higher than the lower limit, bubbles can be more effectively removed. The boiling point of the surface tension regulator is more preferably 150° C. or lower, and still more preferably 130° C. or lower. When the boiling point is equal to or lower than the upper limit, adhesion of the PVA film to a supporting member and adhesion of the PVA film to a metal roll upon formation of the film are further enhanced. In such a case, production of a PVA film is further facilitated.

In cases where the surface tension regulator is a liquid organic solvent, the solubility parameter thereof is preferably 7 or more but 12 or less. A surface tension regulator having a solubility parameter of 7 or more can be easily obtained. If the solubility parameter is more than 12, the compatibility of the surface tension regulator in the PVA aqueous solution is too high, which makes sufficient removal of bubbles difficult.

The solubility parameter of the surface tension regulator is more preferably 11.5 or less, and still more preferably 9 or less. When the solubility parameter is equal to or less than the upper limit, bubbles can be more effectively removed.

The solubility parameter means an SP value. The "SP value" can be calculated by the Fedors method (R. F. Fedors, Polym. Eng. Sci., 14, 147 (1974)).

Bubbles present in the PVA aqueous solution are commonly derived from air, an inert gas, or the like. The use of a surface tension regulator satisfying the above solubility parameter unites bubbles to one another to enable effective removal of bubbles. Moreover, the viscosity around bubbles in the PVA aqueous solution is lowered, so that bubbles can be effectively removed.

In the PVA aqueous solution, the amount of the surface tension regulator is preferably 0.01 parts by weight or more, more preferably 0.05 parts by weight or more, still more preferably 0.1 parts by weight or more, and particularly preferably 0.5 parts by weight or more, and preferably 20 parts by weight or less, more preferably 15 parts by weight or less, and still more preferably 10 parts by weight or less based on 100 parts by weight of the PVA. When the amount of the surface tension regulator is equal to or more than the lower limit, bubbles and droplets can be further effectively removed. When the amount of the organic solvent is equal to or less than the upper limit, the PVA aqueous solution is less likely to become turbid and the surface tension regulator is less likely to be distributed unevenly in the PVA aqueous solution. In such a case, bubbles and droplets can be more effectively removed, and the drying time is further shortened. As a result, a higher quality PVA film can be obtained.

The PVA aqueous solution preferably contains a surface tension regulator in an amount of 0.0001 to 3 parts by weight based on 100 parts by weight of the total amount of PVA and water. With this composition, the surface tension regulator is less likely to be distributed unevenly in the PVA aqueous solution. In such a case, bubbles and droplets can be more effectively removed, the drying time is further shortened, and a higher quality PVA film can be obtained.

(Water)

The PVA aqueous solution contains water together with the surface tension regulator. The PVA is mainly dissolved in the water.

In the PVA aqueous solution, the amount of water is 500 parts by weight or more, preferably 566 parts by weight or more, and more preferably 669 parts by weight or more based on 100 parts by weight of the PVA.

The amount of water is 10000 parts by weight or less, preferably 1900 parts by weight or less, and more preferably 1566 parts by weight or less. When the amount of water is equal to or more than the lower limit, the viscosity of the PVA aqueous solution is appropriately lowered, so that casting of the PVA aqueous solution is facilitated and bubbles can be more effectively removed. When the amount of water is equal to or less than the upper limit, the viscosity of the PVA aqueous solution is appropriately increased, so that casting of the PVA aqueous solution is facilitated, the drying time is further shortened, and the thickness of the PVA film becomes more uniform. As a result, a higher quality PVA film can be obtained.

The amount of water is preferably 85% by weight or more, more preferably 87% by weight or more, and still more preferably 90% by weight or more, and preferably 99% by weight or less, more preferably 95% by weight or less, and still more preferably 94% by weight or less based on 100% by weight of the PVA aqueous solution. When the amount of water is equal to or more than the lower limit, the viscosity of the PVA aqueous solution is appropriately lowered, so that casting of the PVA aqueous solution is facilitated, and bubbles can be more effectively removed. When the amount of water is equal to or less than the upper limit, the viscosity of the PVA aqueous solution is appropriately increased, so that casting of the PVA aqueous solution is facilitated, the drying time is further shortened, and the thickness of the PVA film becomes more uniform. As a result, a higher quality PVA film can be obtained.
(Preservative)

The PVA aqueous solution preferably further contains a preservative. Only one kind of the preservative may be used, or two or more kinds thereof may be used in combination.

PVA is commonly dissolved in a solvent in production of a PVA film. Conventionally, a preservative has not been added to a PVA aqueous solution containing PVA and a solvent. A preservative is known to have a function of suppressing corrosion. The preservative, however, has not at all been added to a PVA aqueous solution containing PVA and a solvent for producing a packaging film or a film to be stretched. For this reason, if a conventional PVA aqueous solution containing PVA and a solvent is stored for a long period of time or exposed to the high-temperature condition or high-humidity condition, the solution may corrode. As a result, a favorable PVA film may not be obtained, or the quality of plural PVA films may vary.

Addition of PVA and a preservative effectively suppresses corrosion of the PVA aqueous solution. In addition, a favorable and uniform PVA film can be obtained.

Examples of the preservative include isothiazolone compounds, glutaraldehyde, and quaternary ammonium compounds. A preservative other than these may also be used.

Since corrosion can be more effectively suppressed, the preservative is preferably a compound having a heterocycle. Since corrosion is more effectively suppressed, the heterocycle preferably contains a nitrogen atom and a sulfur atom in the ring.

Since corrosion can be more effectively suppressed, the preservative is preferably an isothiazolone compound. Examples of the isothiazolone compound include 2-methyl-4-isothiazolin-3-one, 2-octyl-4-isothiazolin-3-one, 5-chloro-2-methyl-4-isothiazolin-3-one, 5-chloro-3-methylisothiazole-3-one, and 2-methylisothiazole-3-one. Examples of the quaternary ammonium compound include benzyl decyl dimethyl ammonium chloride, didecyl dimethyl ammonium chloride, and cetyl pyridinium chloride.

The amount of the preservative is preferably 0.01% by weight or more, and more preferably 0.03% by weight or more, and preferably 1% by weight or less, and more preferably 0.3% by weight or less based on 100% by weight of the PVA aqueous solution. When the amount of the preservative is equal to or more than the lower limit and equal to or less than the upper limit, corrosion of the PVA aqueous solution is further suppressed, and a more favorable and uniform PVA film can be obtained.
(PVA Film and Laminated Film)

The PVA film according to the present invention can be obtained by forming the PVA aqueous solution according to the present invention into a film. The PVA film according to the present invention can be suitably used for obtaining a packaging film or a film to be stretched. The PVA film according to the present invention is also favorably used as a film for packaging agricultural products or a water-soluble film.

The PVA film according to the present invention may be produced by any method. For example, the PVA film according to the present invention can be produced by casting the PVA aqueous solution according to the present invention and drying the casted PVA aqueous solution. Specific examples of the method include a solution casting method, a roll coating method, a spin coating method, a screen coating method, a fountain coating method, a dipping method, and a spraying method.

The laminated film according to the present invention includes a supporting member and a PVA film laminated on the supporting member. In the case of the laminated film according to the present invention, the PVA film is obtained by casting the PVA aqueous solution and drying the casted PVA aqueous solution. As mentioned above, the PVA film may be provided in a state of being laminated on a supporting member.

A laminated film including a supporting member and a polyvinyl alcohol resin layer that is formed from the polyvinyl alcohol aqueous solution of the present invention on the supporting member is also encompassed by the present invention.

The laminated film may be produced by any method. For example, the laminated film may be produced by casting the PVA aqueous solution on a supporting member and drying the casted PVA aqueous solution. The PVA aqueous solution may be casted on the supporting member by any method. Examples of the method include a roll coating method, a spin coating method, a screen coating method, a fountain coating method, a dipping method, and a spraying method.

Specific examples of the roll coating method include a wire bar coating method, a reverse coating method, and a gravure coating method.

The supporting member is preferably capable of keeping the PVA aqueous solution on its surface upon casting of the PVA aqueous solution and supporting the obtainable PVA film. The material of the supporting member may be, for example, a polyolefin, a polyester, an acrylic resin, or the like. A supporting member formed of a material other than these materials may also be used. Examples of the polyolefin include ethylene, polypropylene, ethylene-vinyl acetate copolymers, and ethylene-vinyl alcohol copolymers. Examples of the polyester include polyethylene terephthalate and polyethylene naphthalate. The supporting member is preferably not formed of PVA.

The PVA aqueous solution casted on the supporting member may be dried by any appropriate method. Examples of the drying method include natural drying, and heat drying at a temperature not higher than the glass transition temperature of PVA.

The PVA aqueous solution according to the present invention is preferably used for producing a packaging film or a film to be stretched having a thickness of 30 μm or less, and more preferably used for producing a packaging film or a film to be stretched having a thickness of 20 μm or less. In cases where a thin packaging film or a thin film to be stretched having a thickness of 30 μm or less is to be produced, bubbles or droplets in the film tends to cause rapture of the film upon stretching thereof. In contrast, when the PVA film according to the present invention is used, the film is sufficiently prevented from containing bubbles or droplets therein even in cases where a packaging film or a film to be stretched having a thickness of 30 μm or less is to be produced.

The thickness of the PVA film is preferably 30 μm or less, more preferably 20 μm or less, still more preferably 15 μm or less, and particularly preferably 10 μm or less. The thickness of the PVA film is preferably 1 μm or more. When the thickness of the PVA film is equal to or more than the lower limit, the gas barrier properties are further enhanced. When the thickness of the PVA film is equal to or less than the upper limit, the transparency is further enhanced, and the drying time in production is further shortened to further improve the productivity.

The PVA resin film and the laminated film may be stretched by any method. Examples of the method include stretching using a stretching device such as a tenter and a roller, and tubular stretching. The film may be stretched uniaxially or biaxially. Moreover, a plurality of devices may be used in combination. For example, a successive stretching may be employed in which longitudinal uniaxial stretching by rolls and horizontal stretching by tenters are successively performed. If necessary, the stretched film may be subjected to heat setting to lower its residual stress.

Advantageous Effects of Invention

The present invention can provide a polyvinyl alcohol aqueous solution capable of suppressing contamination by components other than polyvinyl alcohol to form a film that contains few air bubbles and is excellent in adhesion to a base material, and a laminated film formed from the polyvinyl alcohol aqueous solution.

DESCRIPTION OF EMBODIMENTS

Embodiments of the present invention are specifically described in the following with reference to, but not limited to, examples.

Examples 1 to 18

PVA (100 parts by weight, degree of polymerization of 2500, degree of saponification of 98.5 mol %, "CELVOL C350" produced by SEKISUI SPECIALITY CHEMICALS) and water (1150 parts by weight) were mixed and heated at 95° C. for 90 minutes to prepare a stock solution containing 8% by weight of PVA.

The resulting stock solution (1250 parts by weight) was blended with an additive shown in Table 1 in an amount as shown in Table 2, and further blended with an isothiazolone compound (1.25 parts by weight, "SAN-AI BAC IT-20P" produced by SAN-AI OIL Co., Ltd.) as a preservative to give a PVA aqueous solution.

Table 1 shows the kind, solubility parameter, boiling point, and HLB of the additive used.

TABLE 1

| | Additive | | | |
|---|---|---|---|---|
| | Kind | Solubility parameter | Boiling point (° C.) | HLB |
| Example 1-4 | Polyether silicone compound 1 (silicone surfactant with polyether structure in side chain, "KS-604" produced by Shin-Etsu Chemical Co., Ltd.) | — | — | 2.1 |
| Example 5 | Polyether silicone compound 2 (silicone surfactant with polyether structures at both therminals, "KF-6004" produced by Shin-Etsu Chemical Co., Ltd.) | — | — | 9 |
| Example 6 | Polyther silicone compound 3 (silicone surfactant with polyether structure in side chain, "KF-642" produced by Shin-Etsu Chemical Co., Ltd.) | — | — | 12 |
| Example 7 | Polyglycerol lauric acid ester ("UNIGLY GL-106" produced by NOF CORPORATION) | — | — | — |
| Example 8 | Polyglycerol stearic acid ester ("UNIGLY GS-106" produced by NOF CORPORATION) | — | — | — |
| Example 9-12 | Ethyl propionate | 8.7 | 99 | — |
| Example 13 | Toluene | 8.8 | 110 | — |
| Example 14 | Propylene glycol monomethyl ether acetate | 8.7 | 146 | — |
| Example 15 | Propylene glycol monoethyl ether acetate | 8.7 | 158 | — |
| Example 16 | Propylene glycol monoethyl ether | 10.9 | 133 | — |
| Example 17 | Propylene glycol monomethyl ether | 11.1 | 120 | — |
| Example 18 | Hexane | 7.3 | 68 | — |
| Comparative Example 4 | Trimethylolpropane | 15.9 | 160 | — |
| Comparative Example 5 | Ethanol | 12.7 | 78 | — |
| Comparative Example 6 | Terpineol | 10.8 | 219 | — |
| Comparative Example 7 | Emulsion-type defoamer 1 (silicone defoamer with no ether structure, "KM-7752" produced by Shin-Etsu Chemical Co., Ltd.) | — | — | 3.7 |
| Comparative Example 8 | Emulsion-type defoamer 2 (silicone defoamer with no ether structure, "KM-75" produced by Shin-Etsu Chemical Co., Ltd.) | — | — | 4.2 |
| Comparative Example 9 | Polyoxyethylene-polyoxypropylene glycol ("Epan 410" produced by Dai-ichi Kogyo Seiyaku Co., Ltd.) | — | — | — |
| Comparative Example 10 | Polyoxyethylene alkylamine ("Amito 320" produced by Kao Corporation) | — | — | — |
| Comparative Example 11-12 | Amide compound (lauric acid diethanolamide) | — | — | — |

TABLE 2

| | Stock solution | | PVA aqueous solution | | | Evaluation | | | | | | |
|---|---|---|---|---|---|---|---|---|---|---|---|---|
| | | Water | Additive | | | | Number of bubbles (pcs/mL) | | Number of bubble traces | | Peelability (adhesion) | Contamination properties |
| | PVA content (% by weight) | Amount* (parts by weight) | Kind | Amount* (parts by weight) | Surface tension (mN/m) | | Bubble diameter of less than 20 μm | Bubble diameter of 20 μm or more | Number of bubble traces (pcs/m²) | Evaluation | Peel force (N/25 mm) Evaluation | Evaluation |
| Example 1 | 8 | 1150 | Polyether silicone compound 1 | 0.02 | 52.4 | | 230 | 0 | 133 | ⊙⊙ | 0.17 ⊙⊙ | Not contaminated |
| Example 2 | 8 | 1150 | Polyether silicone compound 1 | 0.05 | 50.2 | | 220 | 0 | 110 | ⊙⊙ | 0.17 ⊙⊙ | Not contaminated |
| Example 3 | 8 | 1150 | Polyether silicone compound 1 | 0.1 | 48 | | 200 | 0 | 90 | ⊙⊙ | 0.15 ⊙⊙ | Not contaminated |
| Example 4 | 8 | 1150 | Polyether silicone compound 1 | 0.2 | 46.7 | | 180 | 0 | 50 | ⊙⊙ | 0.14 ⊙⊙ | Not contaminated |
| Example 5 | 8 | 1150 | Polyether silicone compound 2 | 0.05 | 50.1 | | 220 | 0 | 150 | ⊙⊙ | 0.11 ⊙ | Not contaminated |
| Example 6 | 8 | 1150 | Polyether silicone compound 3 | 0.02 | 52.1 | | 230 | 0 | 280 | ⊙ | 0.09 ⊙⊙ | Not contaminated |
| Example 7 | 8 | 1150 | Polyglycerol lauric acid ester | 0.05 | 51.3 | | 230 | 0 | 150 | ⊙⊙ | 0.22 ⊙⊙ | Not contaminated |
| Example 8 | 8 | 1150 | Polyglycerol stearic acid ester | 0.05 | 51.3 | | 230 | 0 | 195 | ⊙ | 0.28 ⊙⊙ | Not contaminated |
| Example 9 | 8 | 1150 | Ethyl propionate | 0.5 | 57.6 | | 200 | 0 | 150 | ⊙⊙ | 0.13 ⊙⊙ | Not contaminated |
| Example 10 | 8 | 1150 | Ethyl propionate | 1 | 56.7 | | 200 | 0 | 143 | ⊙⊙ | 0.15 ⊙⊙ | Not contaminated |
| Example 11 | 8 | 1150 | Ethyl propionate | 1.5 | 56.3 | | 190 | 0 | 138 | ⊙⊙ | 0.16 ⊙⊙ | Not contaminated |
| Example 12 | 8 | 1150 | Ethyl propionate | 10 | 55.1 | | 180 | 0 | 113 | ⊙⊙ | 0.16 ⊙⊙ | Not contaminated |
| Example 13 | 8 | 1150 | Toluene | 1 | 55.3 | | 200 | 0 | 140 | ⊙⊙ | 0.2 ⊙ | Not contaminated |
| Example 14 | 8 | 1150 | Propylene glycol monomethyl ether acetate | 1 | 56.7 | | 200 | 0 | 150 | ⊙⊙ | 0.11 ⊙⊙ | Not contaminated |
| Example 15 | 8 | 1150 | Propylene glycol monoethyl ether acetate | 0.5 | 57.6 | | 200 | 0 | 113 | ⊙⊙ | 0.13 ⊙⊙ | Not contaminated |
| Example 16 | 8 | 1150 | Propylene glycol monoethyl ether | 1 | 56.1 | | 200 | 0 | 150 | ⊙⊙ | 0.12 ⊙⊙ | Not contaminated |
| Example 17 | 8 | 1150 | Propylene glycol monomethyl ether | 1 | 56 | | 200 | 0 | 100 | ⊙⊙ | 0.1 ⊙⊙ | Not contaminated |
| Example 18 | 8 | 1150 | Hexane | 15 | 55 | | 180 | 0 | 90 | ⊙⊙ | 0.21 ⊙⊙ | Not contaminated |
| Comparative Example 1 | 8 | 1150 | — | 0 | 56.7 | | 230 | 0 | 438 | X | 0.10 ⊙ | Not contaminated |
| Comparative Example 2 | 6 | 1567 | — | 0 | 55.4 | | 190 | 0 | 350 | X | 0.11 ⊙ | Not contaminated |
| Comparative Example 3 | 4 | 2400 | — | 0 | 53 | | 180 | 0 | 320 | X | 0.11 ⊙ | Not contaminated |
| Comparative Example 4 | 8 | 1150 | Trimethylolpropane | 1 | 57.5 | | 230 | 0 | 400 | X | 0.05 X | Contaminated |
| Comparative Example 5 | 8 | 1150 | Ethanol | 1 | 56.2 | | 200 | 0 | 302 | X | 0.13 ⊙⊙ | Not contaminated |
| Comparative Example 6 | 8 | 1150 | Terpineol | 1 | 56.8 | | 240 | 0 | 155 | ⊙ | 0.04 X | Contaminated |

TABLE 2-continued

| | Stock solution | | PVA aqueous solution | | | | Evaluation | | | | | |
|---|---|---|---|---|---|---|---|---|---|---|---|---|
| | | | Additive | | | | Number of bubbles (pcs/mL) | | Number of bubble traces | | Peelability (adhesion) | Contamination |
| | PVA content (% by weight) | Water Amount× (parts by weight) | Kind | Amount× (parts by weight) | Surface tension (mN/m) | | Bubble diameter of less than 20 μm | Bubble diameter of 20 μm or more | Number of bubble traces (pcs/m²) | Evaluation | Peel force (N/25 mm) Evaluation | properties Evaluation |
| Comparative Example 6 | 8 | 1150 | Emulsion-type defoamer 1 | 0.02 | 52.1 | | 190 | 0 | 350 | X | 0.11 ○ | Not contaminated |
| Comparative Example 7 | 8 | 1150 | Emulsion-type defoamer 2 | 0.1 | 48 | | 200 | 0 | 340 | X | 0.06 X | Contaminated |
| Comparative Example 8 | 8 | 1150 | Polyoxyethylene-polyoxypropylene glycol | 0.05 | 44.4 | | 230 | 0 | 350 | X | 0.07 X | Contaminated |
| Comparative Example 9 | 8 | 1150 | Polyoxyethylene alkylamine | 0.18 | 39.3 | | 230 | 0 | 450 | X | 0.03 X | Contaminated |
| Comparative Example 10 | 8 | 1150 | Amide compound | 0.05 | 34.5 | | 230 | 0 | 350 | X | 0.08 ○ | Contaminated |
| Comparative Example 11 | 8 | 1150 | Amide compound | 0.1 | 34.8 | | 220 | 0 | 290 | ○ | 0.07 X | Contaminated |
| Example 12 | | | | | | | | | | | | |

×Amount based on 100 parts by weight of PVA

The obtained PVA aqueous solution was applied to a polyethylene terephthalate (PET) film (thickness of 50 μm) as a supporting member using an auto film applicator ("PI-1210" produced by TESTER SANGYO CO., LTD.) and dried at 80° C. for 5 minutes and then at 100° C. for 20 minutes, thereby providing a laminated film in which a PVA film (thickness of 12 μm) is laminated on a supporting member.

Comparative Example 1

A PVA aqueous solution was prepared by blending the stock solution (1250 parts by weight) obtained in Example 1 with an isothiazolone compound (1.25 parts by weight, "SAN-AI BAC IT-20P" produced by SAN-AI OIL Co., Ltd.) as a preservative to give a PVA aqueous solution. In Comparative Example 1, no additive was used. A laminated film was produced in the same manner as in Example 1, except that the thus obtained PVA aqueous solution was used.

Comparative Examples 2 and 3

The PVA aqueous solution obtained in Comparative Example 1 was diluted twice, and the resulting solution was used as Comparative Example 2. Similarly, the PVA aqueous solution obtained in Comparative Example 1 was diluted four times, and the resulting solution was used as Comparative Example 3.

Comparative Examples 4 to 12

The stock solution (1250 parts by weight) obtained in Example 1 was blended with the additive shown in Table 1 in an amount as shown in Table 2, and further blended with an isothiazolone compound (1.25 parts by weight, "SAN-AI BAC IT-20P" produced by SAN-AI OIL Co., Ltd.) as a preservative to give a PVA aqueous solution. A laminated film was prepared in the same manner as in Example 1, except that the obtained PVA aqueous solution was used.

Here, "polyoxyethylene-polyoxypropylene glycol ("Epan410" produced by DAI-ICHI KOGYO SEIYAKU CO., LTD.)" used in Comparative Example 9 is a copolymer of polyoxyethylene and polyoxypropylene.
(Evaluation)
(1) Measurement of Surface Tension The obtained PVA aqueous solution (30 mL) was poured into a petri dish and measured for the surface tension with an automatic tensiometer (DY-300 produced by Kyowa Interface Science Co., Ltd.) by a plate method (Wilhelmy method).

At a room temperature of 20° C. and a humidity of 50%, the surface tension was measured using a platinum plate (10 mm in length×24 mm in width, 0.15 mm in thickness) under the conditions of the sampling interval of 10 seconds, the measurement completion time of 300 seconds, the immersion distance of the platinum plate of 2.5 mm, the immersion time of 1 second, a stage raising speed of 0.7 mm/sec, and the number of measurements of twice.

The value of the surface tension is an average of the values of the surface tension measured from 50 to 300 seconds in the measurement time.
(2) Number of Bubbles The obtained PVA aqueous solution (about 1 mL) was dropped onto a preparation and observed under a laser microscope ("VK-8710" produced by KEYENCE CORPORATION), so that the number of bubbles (the number of bubbles with a diameter of less than 20 μm, the number of bubbles with a diameter of 20 μm or more) in the PVA aqueous solution was counted.

(3) Evaluation of the Number of Bubble Traces in PVA Film

The obtained. PVA film (12 μm in thickness) was cut to a size of 0.2 m in length×0.4 m in width. Ten sheets of the cut PVA films were observed under a laser microscope ("VK-8710" produced by KEYENCE CORPORATION). The number of bubble traces with a diameter of 1 to 100 μm was counted, and the average number of counted bubble traces per square meter was calculated. The number of bubble traces was evaluated based on the following criteria.
[Evaluation Criteria of the Number of Bubble Traces]
Excellent (OO): The number of bubble traces was 150 pcs/m² or less.
Good (O): The number of bubble traces was more than 150 pcs/m² but less than 300 pcs/m².
Poor (x): The number of bubbles was 300 pcs/m² or more.
(4) Evaluation of the Peelability from Polyethylene Terephthalate Film The obtained laminated film was cut to a size of 25 mm in length×100 mm in width. The cut laminated film was subjected to a tensile test in which a PVA film was peeled from a PET film in a 180° direction at a temperature of 23° C., a humidity of 50%, and a peeling rate of 0.3 mm/min, so that the peel force (N/25 mm) was measured.

If a precipitated additive is present inside or on the surface of the film after formation of the film, the peel force tends to decrease. The peelability was evaluated based on the following criteria.
[Evaluation Criteria of Peelability]
Excellent (OO): Peel force of 0.12 N/25 mm or more
Good (O): Peel force of 0.08 N/25 mm or more but less than 0.12 N/25 mm
Poor (x): Peel force of less than 0.08 N/25 mm
(5) Contamination Properties The obtained laminated film was cut to a size of 100 mm in length×100 mm in width. The cut laminated film was left to stand at a temperature of 23° C. and a humidity of 50% for a week. Then, the surface of the laminated film and the surface of a PET film after peeling of the PVA film from the PET film were traced with a finger. In cases where a bled substance was adhered to the finger, "Contaminated" was marked. In cases where no bled substance was adhered to the finger, "Not contaminated" was marked.

INDUSTRIAL APPLICABILITY

The present invention can provide a polyvinyl alcohol aqueous solution capable of suppressing contamination by components other than polyvinyl alcohol to form a film that contains few air bubbles and is excellent in adhesion to a base material, and a laminated film formed of the polyvinyl alcohol aqueous solution.

The invention claimed is:
1. A polyvinyl alcohol aqueous solution comprising polyvinyl alcohol, a surface tension regulator, and water,
the surface tension regulator being at least one selected from the group consisting of a polyether silicone compound, a glycerol compound, a propylene glycol compound, and a fatty acid ester compound,
the glycerol compound being a surfactant represented by the formula (1):

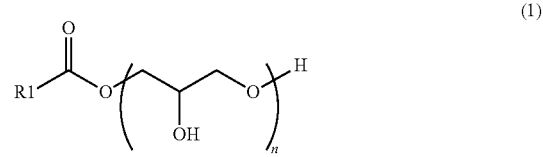

wherein R1 represents a C12-C17 alkyl group and n represents an integer of 1 to 8, the fatty acid ester compound being a compound represented by the formula (2):

R2COOR3     (2)

wherein R2 represents a hydrogen atom or a C1-C3 alkyl group, and R3 represents a hydrogen atom or a C1-C6 alkyl group, the propylene glycol compound being at least one selected from the group consisting of propylene glycol monomethyl ether acetate, propylene glycol monoethyl ether acetate and propylene glycol butyl ether acetate, and having a boiling point of 60° C. to 160° C. inclusive and a solubility parameter of 7 to 12 inclusive, the polyvinyl alcohol aqueous solution containing 500 to 10000 parts by weight of water based on 100 parts by weight of the polyvinyl alcohol and having a surface tension measured at 20° C. of 45 to 72 mN/m, and an amount of the polyether silicone compound being 0.01 to 0.2 parts by weight based on 100 parts by weight of the polyvinyl alcohol.

2. The polyvinyl alcohol aqueous solution according to claim 1,
containing 0.0001 to 3 parts by weight of the surface tension regulator based on 100 parts by weight of the total of the polyvinyl alcohol and the water.

3. The polyvinyl alcohol aqueous solution according to claim 1,
containing 0.01 to 20 parts by weight of the surface tension regulator based on 100 parts by weight of the polyvinyl alcohol.

4. The polyvinyl alcohol aqueous solution according to claim 1,
wherein the polyether silicone compound is a silicone surfactant with an ether structure having an HLB of 0 to 12.0 inclusive.

5. The polyvinyl alcohol aqueous solution according to claim 1,
wherein the fatty acid ester compound has a boiling point of 60° C. to 160° C. inclusive and a solubility parameter of 7 to 12 inclusive.

6. The polyvinyl alcohol aqueous solution according to claim 1, further comprising a preservative.

7. The polyvinyl alcohol aqueous solution according to claim 1,
which is used for producing a polyvinyl alcohol film that is formed into a packaging film or a film to be stretched.

8. A method for producing a polyvinyl alcohol film comprising the step of
casting on a supporting member the polyvinyl alcohol aqueous solution according to claim 1, followed by drying.

9. A laminated film comprising
a supporting member and
a polyvinyl alcohol resin layer formed of the polyvinyl alcohol aqueous solution according to claim 1 on the supporting member.

* * * * *